(12) United States Patent
Ankeny

(10) Patent No.: US 10,077,914 B2
(45) Date of Patent: Sep. 18, 2018

(54) SOIL INFRASTRUCTURE SYSTEMS FOR SUSTAINABLE AND INTEGRATED ECONOMIC AND ENVIRONMENTAL PERFORMANCE

(71) Applicant: Mark Ankeny, Idaho Falls, ID (US)

(72) Inventor: Mark Ankeny, Idaho Falls, ID (US)

(*) Notice: Subject to any disclaimer, the term of this patent is extended or adjusted under 35 U.S.C. 154(b) by 156 days.

(21) Appl. No.: 15/042,013

(22) Filed: Feb. 11, 2016

(65) Prior Publication Data
US 2016/0231011 A1  Aug. 11, 2016

Related U.S. Application Data

(60) Provisional application No. 62/114,780, filed on Feb. 11, 2015.

(51) Int. Cl.
| | |
|---|---|
| F24F 5/00 | (2006.01) |
| F25B 30/06 | (2006.01) |
| F24J 3/08 | (2006.01) |
| F24T 10/10 | (2018.01) |
| F28D 5/02 | (2006.01) |
| F28D 20/00 | (2006.01) |

(52) U.S. Cl.
CPC ............ *F24F 5/0046* (2013.01); *F24F 5/005* (2013.01); *F24F 5/0035* (2013.01); *F24J 3/081* (2013.01); *F24T 10/10* (2018.05); *F25B 30/06* (2013.01); *F28D 5/02* (2013.01); *F24F 2005/0053* (2013.01); *F24F 2005/0057* (2013.01); *F28D 20/0052* (2013.01); *Y02B 10/40* (2013.01); *Y02B 30/547* (2013.01); *Y02E 10/12* (2013.01)

(58) Field of Classification Search
CPC .. F24F 5/0046; F24F 2005/0057; F24F 5/005; F24F 2005/0053; Y02B 10/40; Y02B 30/547; Y02E 10/12; F24J 3/081; F24J 3/085; F24J 3/086; F24J 2003/087; F28D 20/0052
See application file for complete search history.

(56) References Cited

U.S. PATENT DOCUMENTS

| | | | | |
|---|---|---|---|---|
| 4,106,555 A | * | 8/1978 | Quintal | F24J 3/081 165/185 |
| 4,257,239 A | * | 3/1981 | Partin | F24J 3/081 165/45 |
| 4,293,237 A | * | 10/1981 | Robey | A01G 25/06 405/39 |

(Continued)

OTHER PUBLICATIONS

Dr. Walter H. Gardner, "How Water Moves in the Soil", 1962.*

*Primary Examiner* — Christopher R Zerphey
(74) *Attorney, Agent, or Firm* — Neugeboren O'Dowd PC

(57) ABSTRACT

Environmental enhancement systems and methods are disclosed. The environmental enhancement system may include a ground source heat pump including a subsurface ground loop portion and a liquid supply system to apply liquid (e.g., wastewater) to soil that is proximate to the subsurface ground loop portion. Performance of the ground source heat pump is improved by increasing heat transfer between the ground loop portion and the soil that is proximate to the subsurface ground loop portion. A gas injection system may be used to inject a gas into the soil that is proximate to the subsurface ground loop portion thereby cooling the soil, liquid, and air at a surface of the soil.

6 Claims, 6 Drawing Sheets

(56) References Cited

U.S. PATENT DOCUMENTS

| | | | | |
|---|---|---|---|---|
| 4,299,277 A | * | 11/1981 | McGregor | F24D 11/02 |
| | | | | 126/640 |
| 4,466,256 A | * | 8/1984 | MacCracken | F24F 5/0046 |
| | | | | 126/400 |
| 5,069,199 A | * | 12/1991 | Messner | F24J 2/0438 |
| | | | | 126/400 |
| 8,662,147 B2 | * | 3/2014 | Juris | F24F 5/0046 |
| | | | | 165/104.34 |
| 9,038,408 B2 | * | 5/2015 | Sabo | F24J 3/081 |
| | | | | 62/260 |
| 2009/0052990 A1 | * | 2/2009 | Richardson | A01G 25/06 |
| | | | | 405/43 |

* cited by examiner

SOIL INFRASTRUCTURE SYSTEMS FOR SUSTAINABLE AND INTEGRATED ECONOMIC AND ENVIRONMENTAL PERFORMANCE

CLAIM OF PRIORITY UNDER 35 U.S.C. § 119

The present application for patent claims priority to Provisional Application No. 62/114,780 entitled "Soil Infrastructure Systems for Sustainable and Integrated Economic and Environmental Performance" filed Feb. 11, 2015, and assigned to the assignee hereof and hereby expressly incorporated by reference herein.

BACKGROUND

Soil has mechanical, physical, pneumatic, hydrologic, chemical, thermal and biological properties that can be integrated in building and urban design to enhance the sustainability and improve the environmental and economic performance of both inside and outside spaces. Concurrent consideration of these soil properties, in conjunction with climate and building characteristics allows treatment of nearby soil as an extension of building infrastructure.

Soil properties have mostly been considered in piecemeal fashion for traditional building design. For example, mechanical properties such as compaction are important for foundations; physical/hydrological properties are important for infiltration of water; chemical properties are important for plant growth and sorption of contaminants; and biological properties are important for septic leach fields. Newer "green" building designs incorporate water harvesting, ground source heat pumps for thermal management of buildings, biological treatment of gray water and other features that rely upon knowledge of a narrow set of soil characteristics to optimize soil performance for a single given function.

SUMMARY

According to an aspect, a method includes cooling a premises with a ground source heat pump system that includes a subsurface ground loop portion and applying, with a subsurface irrigation system, water to subsurface regions of soil that are proximate to the subsurface ground loop portion thereby increasing heat transfer between the ground loop portion and the regions of soil that are proximate to the subsurface ground loop portion. In addition, water is perched within the soil proximate to the subsurface ground loop portion with a capillary barrier disposed below the subsurface ground loop portion and the subsurface irrigation system, and gas is injected into the regions of soil that are proximate to the subsurface ground loop portion thereby cooling the regions of soil that are proximate to the subsurface ground loop portion.

According to another aspect, an environmental enhancement system includes a subsurface ground loop portion of a ground source heat pump to provide cooling to a premises and a water supply system to apply water to soil that is proximate to the subsurface ground loop portion thereby improving performance of the ground source heat pump by increasing heat transfer between the ground loop portion and the soil that is proximate to the subsurface ground loop portion. The system also includes a gas injection system disposed to inject a gas into the soil that is proximate to the subsurface ground loop portion to enable the water in the soil that is proximate to the subsurface ground loop to vaporize.

According to yet another aspect, an environmental enhancement system includes a ground source heat pump to provide cooling to a premises and a water supply system to apply water to soil that is proximate to a subsurface ground loop portion of the ground source heat pump to improve performance of the ground source heat pump by increasing heat transfer between the ground loop portion and the soil that is proximate to the subsurface ground loop portion. A capillary barrier is positioned below irrigation tubing of the water supply system to impede downward water flow through soil proximate to the ground loop portion.

DETAILED DESCRIPTION

Figure 1:
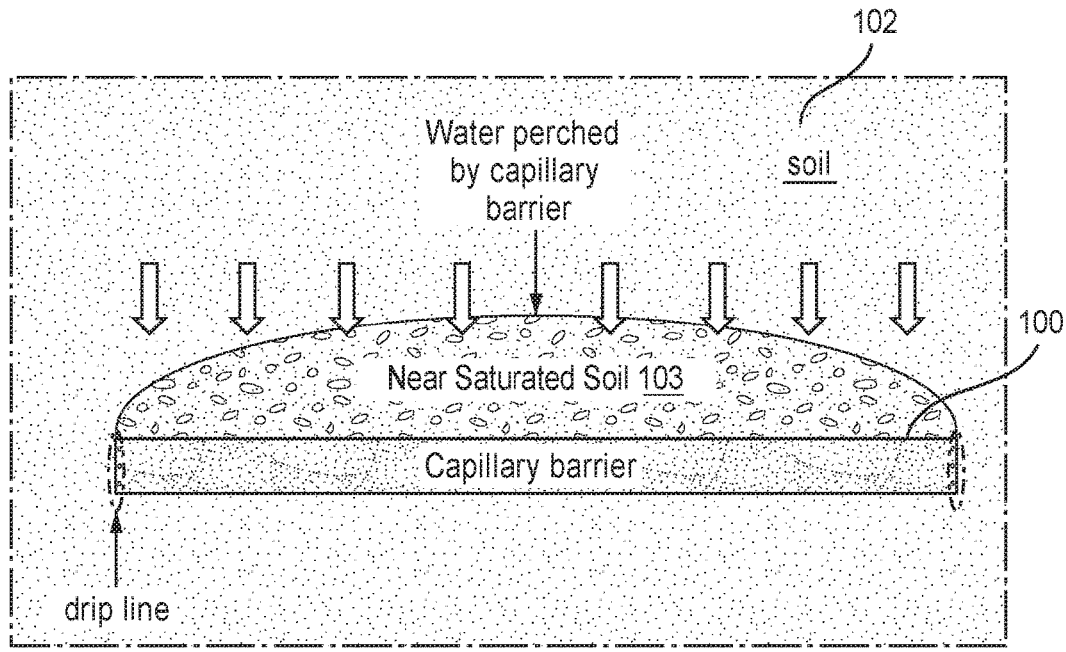
FIG. 1 is a cut-away-view of a soil-environment depicting an exemplary embodiment.

Collectively considered, these component uses of soil leads to novel sustainability opportunities that may integrate the heating, cooling and cleaning of air, cleaning and cooling of water, waste treatment with novel demands for engineering soil as an integral component of building infrastructure to concurrently satisfy mechanical, physical, chemical, thermal and biological design criteria to economically meet LEEDS (Leadership in Energy & Environmental Design) and other certification requirements.

Ground source heat pump (GSHP) ground loop (GL) efficiencies vary greatly with soil thermal properties associated with texture and soil water content. Errors in measuring or calculating these properties have often lead to expensive, oversized systems or to undersized systems for meeting heating and cooling requirements. However, at or near soil saturation, differences in soil texture make very little difference in the key thermal properties of volumetric heat capacity and thermal conductivity and these errors can be avoided. In addition, under saturated or near saturated conditions, volumetric heat capacity and thermal conductivity are near the maximum possible, which allows for a smaller more economical system with greater predictability of performance Near saturated conditions adjacent to GL tubing can be created even in arid systems with almost any soil type by use of a simple inexpensive capillary barrier.

In one embodiment, GL tubing installation is usefully and novelly combined with a soil capillary barrier to improve building thermal and water management performance GLs are commonly installed approximately two meters below ground surface in open areas near buildings. Water flowing through the tubing exchanges heat with the surrounding soil for more efficient heating in winter and cooling in summer. The installation costs associated with moving such large volumes of soil (approximately 80 cubic meters) for a typical household are expensive and can be reduced with a capillary barrier Simply put, capillary barriers impede the downward flow of water through unsaturated soil.

The use of a capillary barrier with a GL greatly increases the water content of the soil surrounding the GL tubing by impeding downward flow of water. Increased water content increases both the thermal conductivity ($\lambda$) and volumetric water content ($C_v$) of the soil surrounding the GL tubing. Thermal conductivity and volumetric heat capacity are the key design parameters for improving GL efficiencies. The use of a capillary barrier also reduces variability in $\lambda$ and $C_v$ across soil types because at or near soil saturation, soils of widely different textures have near maximum values of $\lambda$ and $C_v$ which allows for a smaller, more economical system with greater predictability of performance. As a consequence, use of a capillary barrier reduces or eliminates the errors that are often associated with thermal conductivity and volumetric heat capacity calculations; thus expensive oversizing of systems or problematic under-sizing of systems can be avoided.

Improved heat capacity and heat transfer also reduces the overall footprint and cost of the GL system. The problems of excavating large volumes of soil and of highly variable soil thermal properties can be solved for almost any soil type by use of a simple and inexpensive capillary barrier.

Referring to FIG. 1, shown is a general example of a capillary barrier 100 disposed in a subsurface region of soil 102. In one embodiment, the capillary barrier 100 may be composed of a simple porous hydrophobic geofabric, which causes perched water to pond (achieve positive head) and form near saturated soil 103 above the capillary barrier 100 and to drip through the hydrophobic pores of the fabric to the soil below. As water is added above the capillary barrier 100, the soil gets wetter and the water above the capillary barrier in the near saturated soil 103 is forced to flow sideways and off the capillary barrier 100 at the drip line as shown in FIG. 1. In other embodiments, the capillary barrier 100 may be composed of a simple porous hydrophilic geofabric. Both hydrophobic and hydrophilic geofabric are readily available from a variety of wholesale and retail providers. In yet another embodiment, the capillary barrier 100 may be realized by sand. For simplicity, the near saturated soil 103 is depicted in FIG. 1 as a bubble-shaped region of increased water content, that occupies much, but not all, of the space (e.g., pores) within the soil 102; thus the near saturated soil 103 includes water, soil, and a gas (typically air) phase. The water may flow through the soil 102 as described further herein in more detail.

It should be recognized that the terms "water" and "air" as used herein are specific examples of liquids and gasses, respectively. In other words, in many embodiments, liquids other than water and gasses other than air may be utilized. But in some embodiments water (e.g., pure or greywater) is used because it has a high thermal conductivity and is capable of undergoing a phase change to a vapor. Similarly, air (e.g., pure or contaminated air) is used because it is readily available and serves as a medium for a liquid to undergo a phase change. In addition, the term "soil" as used throughout this disclosure generally refers to porous matter that may include a mixture of minerals, organic matter, and organisms. In many embodiments, the soil that is utilized is naturally occurring, and other than being displaced or moved from one location to another, the soil is unaltered in its composition. In other embodiments it is contemplated that the soil is enhanced, altered, and/or engineered in one or more aspects.

Figure 2:
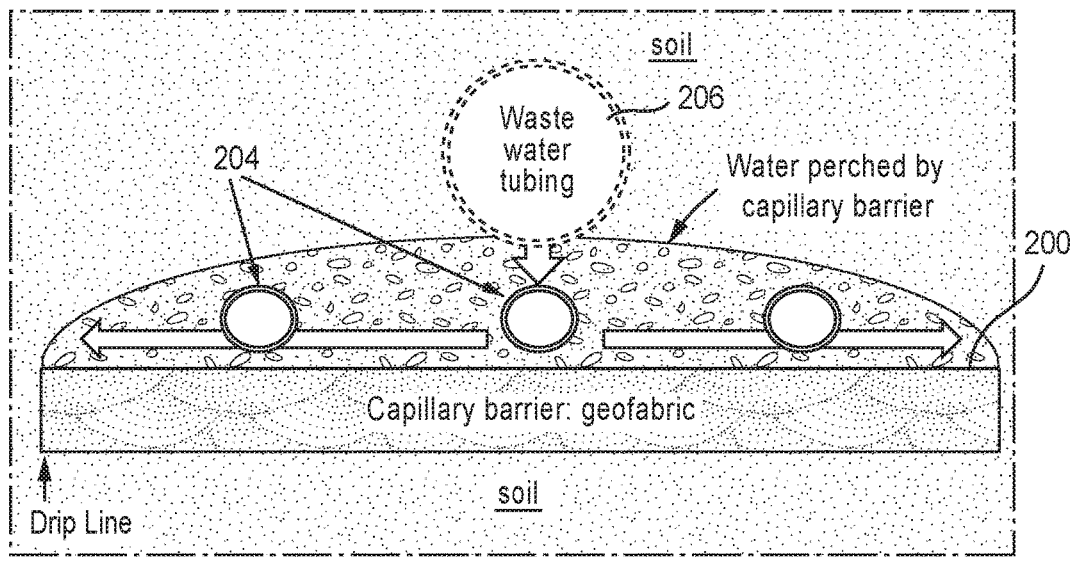
FIG. 2 is a is a cut-away-view of a soil-environment depicting another embodiment.

As depicted in FIG. 2, GL tubing 204 (e.g., that forms a portion of a subsurface ground loop of a ground source heat pump) can be placed on top of a capillary barrier 200 (e.g., an inexpensive impermeable or porous hydrophobic geofabric) and then covered with local soil. The capillary barrier 200 greatly increases the water held in the soil surrounding the tubing (forming near-saturated soil) and improves volumetric heat capacities and thermal conductivities. If water is added over the middle of the capillary barrier 200, it forces concentrated advective water flow past the GSHP tubing 204 to maximize advective velocity, water evaporation and heat exchange. The added water ultimately flows to and off the edge of the capillary barrier at the drip line.

Also depicted in FIG. 2 is the addition of water supply 206 (e.g., a waste water supply) tubing that provides water to the soil that surrounds the GL tubing 204. The water that is fed to the GL tubing 204 may come from a variety of sources, and may be fed below the surface of the soil in close proximity to the GL tubing 204.

Figure 3:
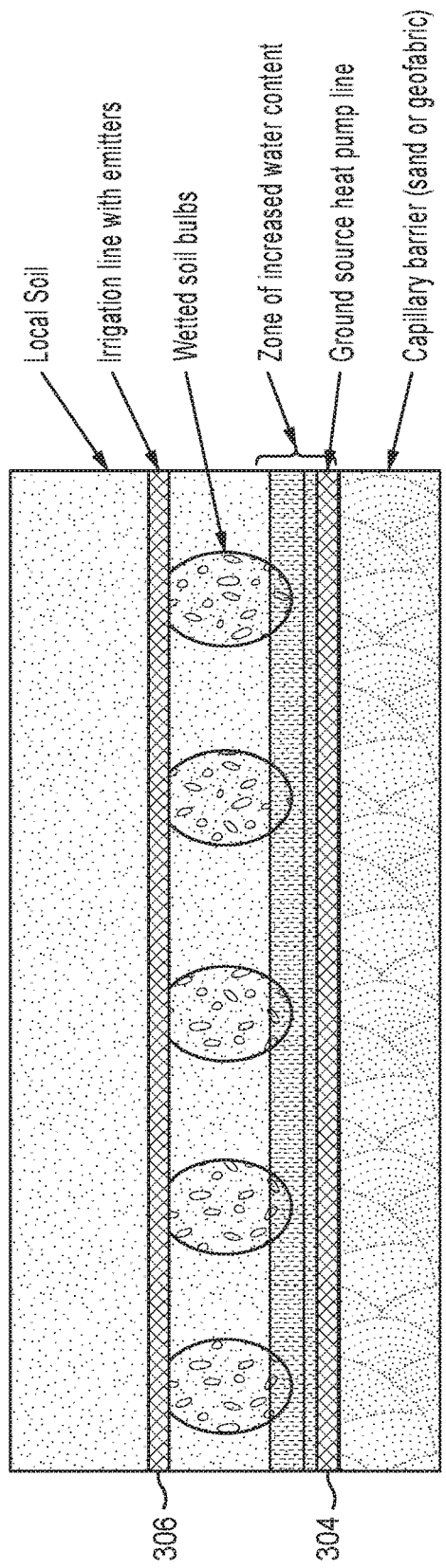
FIG. 3 is a is a cut-away-view of a soil-environment depicting aspects of another implementation.
Figure 4:
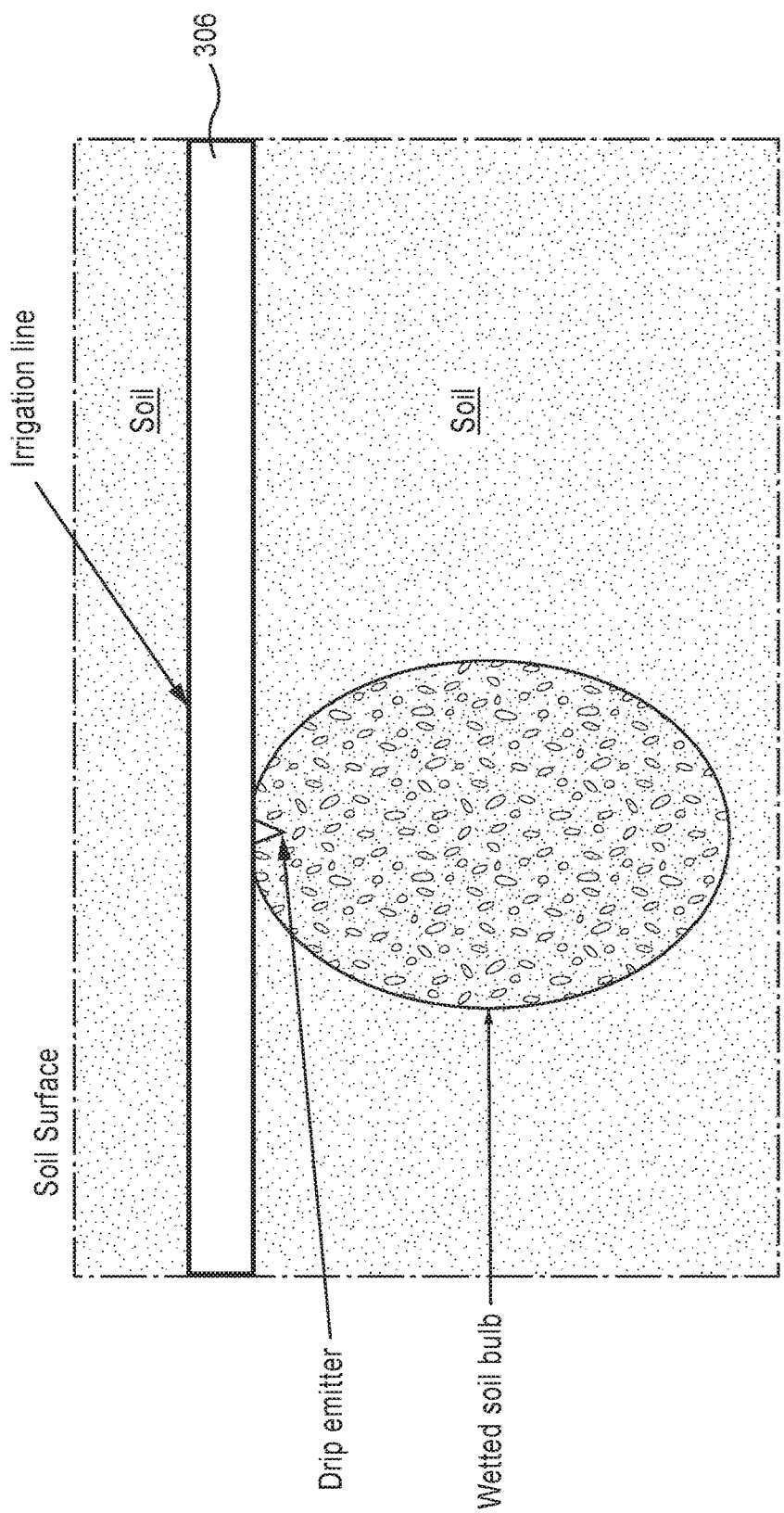
FIG. 4 is an exploded view of a portion of FIG. 3.

As shown in FIG. 3, the water supply may 206 include drip lines 306 that are disposed below the surface of the soil, and drip emitters may be disposed along the drip lines to form wetted soil bulbs of near-saturated soil within the soil. As depicted in FIG. 3, a zone of increased water content is formed within the soil that is thermally coupled with the GL lines 304. As depicted, the GSHP lines 304 are disposed between the irrigation lines 306 and the capillary barrier. FIG. 4 is an exploded view of a portion of FIG. 3 that depicts a wetted soil bulb formed from a drip emitter of an irrigation line 306.

Buildings and facilities in many areas (e.g., most of the Southwest United States) have larger annual cooling demands than heating demands. In these areas, shallower and less expensive systems using wastewater or irrigation water can be used for improved performance and reduced cost. Given that approximately half of the cost structure for GSHPs is the installation of the ground loop in the soil, the marginal cost for installing additional plumbing (to inject air and/or to apply water to sub-surface soil near GL lines) is minimal for the cooling capacity gained.

Simple plumbing allows ready addition of supplemental water from roofs, runoff/runon, graywater or irrigation water. Because capillary barriers increase soil water content to near saturation with modest water addition, thermal conductivity and volumetric heat capacities are increased for all soil types and performance variability due to variable water content is decreased. Thus, installed footprints can be smaller and less expensive because performance per unit area is both higher and more predictable.

Applying wastewater in agricultural fields with GL systems has the potential to make full use of the waste heat, waste water and waste nutrients from a water treatment plant. While GSHP systems traditionally operate as a simple radiator without advective air flow for cooling and are therefore viewed as diffusion-limited for design considerations, joint emplacement with an advective air injection system eliminates this limitation. At higher fluxes, gas (e.g., air) injection can be used to cool wastewater and the vadose zone can be used to cool groundwater arriving at gaining streams under thermal threat or with thermal TMDLs. For example, many western waste water treatment plants face expensive engineered evaporative cooling before returning treated water to streams at temperatures that won't kill fish. Water can now be cooled and recharged nearer locations requiring recharge or cooling.

Subsurface evaporative cooling often provides an additional environmental and economic benefit by cooling water that ultimately passes through the GSHP system to groundwater. Many municipalities have wastewater with heat and/or nutrients in excess of local total mass daily loading (TMDL) regulatory requirements. These requirements often drive extremely large capital budgets compared to the costs of GSHPs and subsurface irrigation systems. For municipalities in urbanizing watersheds, subsurface irrigation systems using wastewater can be jointly emplaced in agricultural fields below tillage depth with GL and air injection systems. Depending upon the design the same plumbing can be used for alternate injections of air and water. Public Works Directors are interested in the savings and regulators are interested in the sustainability and reduced greenhouse gas outputs associated with this approach.

Figure 5:
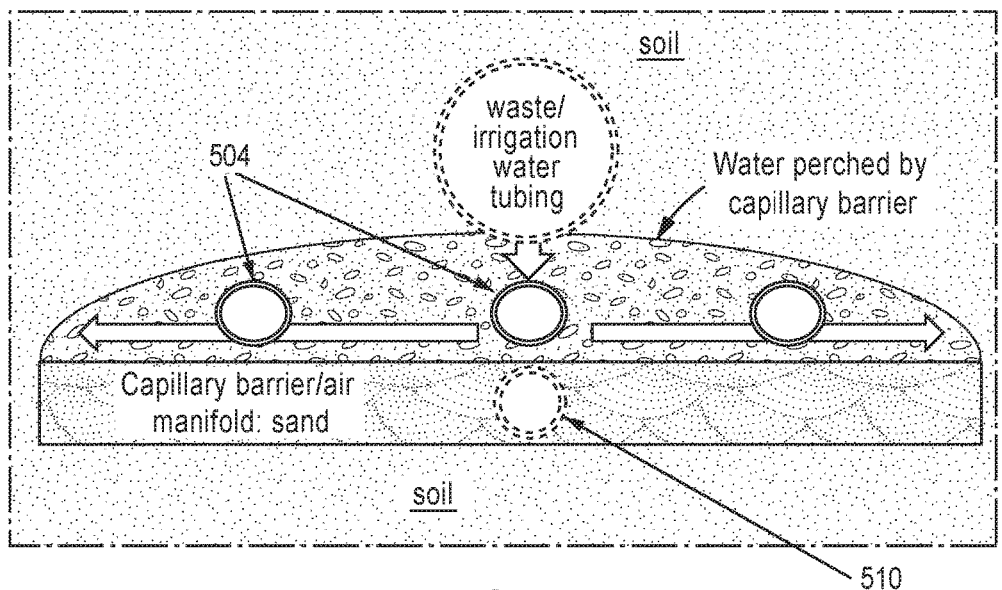
FIG. 5 is a cut-away-view of a soil-environment depicting yet another embodiment.

As depicted in FIG. 5, in some embodiments GL tubing 504 is evaporatively cooled in the subsurface soil by injection of air into the soil near the GL tubing 504. As shown, in this embodiment, gas (e.g., air) is injected into the soil via air injection tubing 510, to enable evaporative cooling of the soil and soil water surrounding the GL tubing 504. As one of ordinary skill in the art will appreciate, a variety of different types of gas distribution techniques may be utilized to disperse air from the air injection tubing 510 along the capillary barrier in close connection with the soil that surrounds the GSHP tubing 504. Any standard irrigation system that is used to apply water (e.g., a drip and/or spray irrigation system) may be used to apply air, but generally the air injection tubing 510 is configured and positioned so that most air flow is directed upward through near-saturated soil towards and past the GL tubing 504. And by virtue of the higher air permeability of the soil-water material above the capillary barrier (relative to the soil below the capillary barrier) the air flow will be directed upward. Root systems of vegetation planted at the surface of the soil increases the air permeability of the soil and improves the upward flow of the injected gas through the wetted, near-saturated soil that forms around the GL tubing 504.

Beneficially, the mixing of the gas and the liquid in the wetted soil enables the liquid to vaporize within the soil in the environment around the GL tubing 504. As a consequence, thermal energy that is transferred from the GL tubing 504 to the liquid water is further converted into a vapor form that is transported by advective air flow out of the top of the system thus enabling efficient and ongoing transfer of heat away from the GSHP tubing 504. Evaporative cooling is familiarly encountered in evaporation off of soil surfaces and in evaporative ("swamp") coolers. Although GSHPs and evaporative coolers often compete in the commercial cooling market, a novel version of evaporative cooling that forces air through soil covered with vegetation or porous concrete, can complement the GSHP value proposition in many regions around the world. Soil evaporative cooling in connection with a GSHP at the scale of a typical home or office park results in a value-added product with a number of desirable environmental and economic benefits including the cool air that exits the surface of the soil as well as the cooled water exiting the bottom of the system to groundwater.

Those of skill in the art in view of this disclosure will appreciate that sand and other hydrophilic materials exposed to water have a positive wetting angle and hydrophobic geofabrics have a negative wetting angle. Although either hydrophilic or hydrophobic materials may be used to realize the capillary barrier, the air permeability and thermal conductivity of the soil positioned over the capillary barrier will be affected by the hydrophobicity or hydrophilicity and/or grain size of the capillary barrier. As a consequence, the particular type of capillary barrier that is selected may affect placement of the air injection tubing and irrigation tube to achieve optimal performance.

Figure 6:
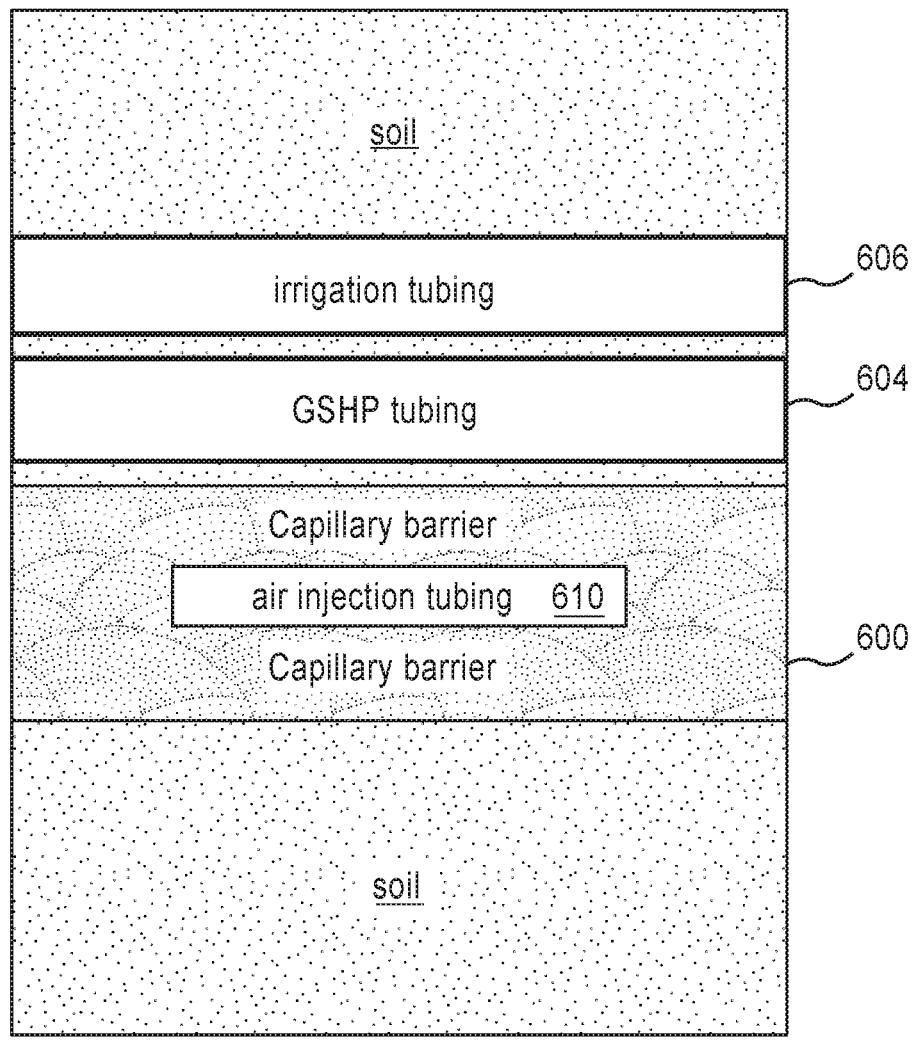
FIG. 6 is a is a cut-away-view of a soil-environment depicting another implementation.

FIG. 6 depicts the relative positioning of soil, irrigation tubing 606, GL tubing 604, air injection tubing 610, and a capillary barrier 600 in one exemplary implementation, but it is contemplated that the one or more of the sub-system tubing layers (e.g., irrigation tubing 606, GSHP tubing 604, and air injection tubing 610) may be intertwined. It also possible that the air injection tubing 610 may be positioned on top of the capillary barrier 600 as opposed to being positioned within the capillary barrier 600. In this drawing (and other drawings in this disclosure) the top of the page is in an upward direction and the bottom of the page is in a downward direction. In FIG. 6 for example, the capillary barrier 600 is positioned in a downward direction (e.g., a direction of gravitational pull) from the irrigation tubing 606. Similarly, a surface of the soil near the top of the page (and exposed to earth's atmosphere) is an upward direction from the capillary barrier 600.

Figure 7:
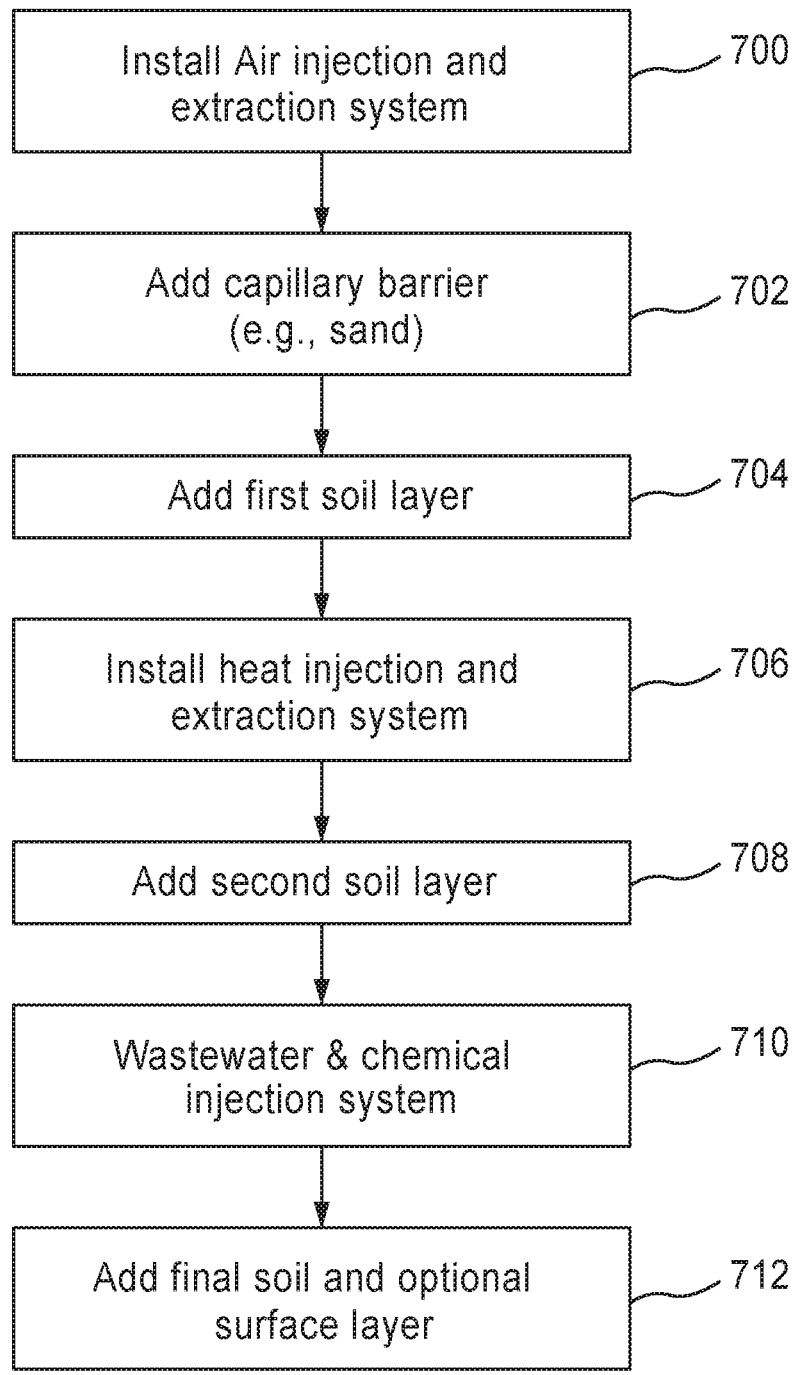
FIG. 7 is a flowchart depicting a method that may be traversed in connection with embodiments disclosed herein.

FIG. 7 depicts a flowchart for a method of constructing an enhanced GL system, which may be used for cooling a premises (e.g., a residential, commercial, recreational, or industrial premises). The example embodiment shows system construction starting with placement of a gas phase injection/extraction system (e.g., an air injection/extraction system) (Block 700) in connection with placement of a capillary layer such as a coarse porous material (e.g., sand) to serve as a capillary barrier to impede downward water flow and provide a manifold for uniform air flow (Block 702). As discussed above, the air injection tubing may be positioned within the capillary barrier (e.g., with sand) or may be positioned on top of the capillary barrier. The addition of a first soil layer on top of the capillary barrier (Block 704) is followed by placement and installation of a heat injection and extraction system (e.g., installation of heat pump tubing on or slightly above the capillary barrier (Block 706), and then a second layer of soil is added around the heat pump tubing to store water and effect heat transfer (Block 708). Next a water/chemical injection system is placed on the second soil layer (Block 710), and then a final layer of soil is added followed by placement of optional plants or paving (Block 712). Individual systems can be omitted for specific applications and geofabrics can substitute for porous materials in other applications. Modules or cartridges of several elements can also be constructed offsite and laid or unrolled into place. When sand is used as a capillary barrier, the water content increases around GL tubing and the sand acts as a high air permeability manifold to uniformly spread injected air to evaporatively cool GL tubing and push cooled air towards the surface.

Exemplary Embodiments and Applications

Although ground source heat pumps can save buildings significant energy, ground loops (GLs) have high installation costs and are difficult to size and design. Half of the cost of a GSHP system and most of the design uncertainty is associated with the GL and the surrounding soil. GLs typically serve buildings with annual imbalances of heating and cooling due to building loads and/or climate. For buildings with high cooling needs, a GSHP GL would currently have to be oversized to meet cooling requirements.

But an order of magnitude improvement in GL cooling efficiency is obtainable using subsurface evaporative cooling over simple thermal diffusion; thus enabling the GL to be reduced in size. This is achieved by placing a capillary barrier underneath the ground loop. The capillary barrier increases the water content of the soil adjacent to the ground loop to near saturation which maximizes two key soil thermal parameters: thermal conductivity and volumetric heat capacity. Air injection evaporates water and cools the ground loop. Soil cooled by evaporative air flow can remain cold over a period from days to months, depending on heat added from the GL. The ability of the soil to remain cold over time allows soil cooling to occur when electricity is less expensive (e.g., nights) further improving the GLs economic performance during summer afternoons when electric rates typically peak. Thus, electrical peak shaving is achieved by off peak cooling and soil thermal storage.

A soil science design approach reduces footprint size, performance variability and capital costs of the ground loop while using diurnal thermal storage to reduce peak electricity demand GSHP capital costs could be reduced by 25% or more.

It is also possible to implement a viable cooling system using a shallow ground loop (e.g., about 0.5 meters in depth, but less than 1 meter in depth, compared to a typical 1.5 to 2-meter depth) in connection with the sub-surface evaporative cooling approach described herein (e.g., with reference to FIG. 5).

In one embodiment, a GSHP is implemented in connection with a capillary barrier. The capillary barrier may be realized by an impermeable barrier, a permeable hydrophobic barrier, or sand capillary barrier. An example application is in humid areas where the capillary barrier increases water contents surrounding GL tubing. Supplemental water can often be obtained from the buildings the GL supports such as gray water, runoff from impermeable surfaces, pipe leaks or irrigation.

Air injection and GL systems emplaced in agricultural fields below the tillage zone also offer benefits from an agricultural perspective. The soil zone below the roots and above the water table is essentially unused infrastructure that could be capitalized with investment in plumbing and thereby monetizable. From an agronomic perspective, hot weather can reduce pollination and yield and damage seed quality. Plants, like people, benefit from cooling when under thermal stress. Subsurface air injection coupled with fans can use soil heat to avoid crop freezing. Air injection also oxygenates roots, which occasionally is associated with yield responses. High value crops that are sensitive to temperature, common in seed production, would also benefit from reduced environmental and associated financial risk. While farm operations will affect the air permeability structure, the system can be managed to optimize overall thermal performance, water quality and agronomic production, increasing economic and environmental sustainability Property values and livability in a heating/cooling district are also likely to benefit from a many acre evaporative cooler in the neighborhood.

In another embodiment, airflow is employed with a sand capillary barrier for root zone aeration and for thermal tempering or cleaning of an outdoor environment for crops or human activities such as back yards, plazas, playing fields or entire neighborhoods. The airflow system can be coupled to standard HVAC plumbing to air intakes close to intersections or other locations with high emissions of particulates or NOx's and SOx's. Particulates will be filtered out in soil and NOx's and SOx's will partition into the soil solution resulting in the 'exhaust gas' emanating from the soil surface being both cooler and cleaner. Conversely, air can be pulled in through the soil and exhausted as a point source of clean air near building air intakes typically found at ground level where cool air can be pooled. Air exhausted in fenced urban areas such as parks or playing fields to contain the denser cooled and cleaned air can provide a respite for the respiratorily-challenged living in polluted environments. Asthma and other respiratory ailments typically correlate closely to local air quality and air filtering and conditioning in polluted urban areas or dusty rural areas could improve health. More than one air, water or heat pipe levels can be used to increase treatment capacity per available unit area.

Mass transfer processes result in nearly 100% relative humidity after the injected air has passed through just the several centimeters of soil adjacent to the GL. Similarly, volatile compounds and reactive gases in injected air will mostly partition into soil water and onto soil surfaces during flow through soil. Particulates are filtered out. In urban areas with heavy vehicular traffic, this offers a new and needed tool for air quality improvement. Bad air intakes can be placed using standard HVAC approaches.

Well-developed near-surface plant root systems and the continuous channels surrounding the roots typically result in large air permeabilities near the surface and high air flow with little back pressure when air is injected. Both air and water flow can and do move preferentially through the soil channels made by the root systems with low pneumatic and hydraulic resistance. This natural permeability structure allows use of pumps with energy efficient low backpressure performance curves to pump air through soil. The extensive surficial root systems of turf grasses have a similar effect on soil air permeability. Many lawns with irrigation systems apply water at about a rate of five to ten centimeters per hour with no runoff. Substituting in the fluid properties of air for density and viscosity gives an air flow rate through a grass root system more than ten-fold greater or one meter per hour with very low backpressure. Much higher flows are possible with small pressure increases. Turf grass is also the only 'crop' with a more acres than corn in the US. While annual corn roots have remarkable effects on soil permeability structure, perennial plants common near GSHP installations often have stronger effects exploitable for these applications. The ubiquity of perennial grass at many locations worthy of consideration for GSHPs makes the fine points of plant-soil permeability effects worthy of attention. The combination of commonly overwatered turf with a capillary barrier further improves heating and cooling efficiencies. Localized overwatering and leaks are dispersed laterally exactly where heat requires dispersion.

Natural evaporative cooling has environmental and economic value in urban and suburban settings. Many studies have shown the 'cool island' effects of parks and gardens in urban areas. In cool islands, evapotranspiration can cool air over 7° C. The local production and accumulation of cooler denser air that surrounds transpiring vegetation eventually results in a bubble of heavier air spreading laterally across the ground surface and pleasant/measurable thermally-driven air flows have been measured a half a kilometer away with local reductions in demand for air conditioning. These are often locally known as 'park breezes'.

Cool islands have additional economic value partially because they offset expensive and uncomfortable urban 'heat island' effects. Typically, electricity demand in cities increases by 2-4% for each 1° C. increase in temperature. Thus, 5-10% of urban electricity demand is squandered to cool buildings just to compensate for the heat island effect. In the US alone, mitigation of urban heat islands could potentially reduce national energy use in air conditioning by 20% and save over $10B per year in energy use and improvement in urban air quality. Thus, the value of green infrastructure innovations that offer the potential to multiply local urban evapotranspiration several-fold are both quantifiable and of significant economic value.

Gas (e.g., air) injection and subsurface irrigation systems at larger scale offer the possibilities of heating and cooling districts to modify outside temperatures with attendant economies of scale. Cooled and cleaned air moving at ground level will find its way into ground level building air intakes. Systems of this scale can be integrated into yards, new office parks and subdivisions. In a fenced yard, cool air would fill the yard from the bottom up with cool denser air and greatly increase the comfort level. At a farmer's market, park or fair scale, comfort can increase revenues.

At an agricultural field scale in an urbanizing watershed, park breezes could be designed to affect thousands. This is the same scale that the business models of heating and cooling districts are relevant. Agricultural field scale is also the scale that many utilities could use to dispose of wastewater using subsurface irrigation at great savings.

In yet another embodiment, a sand capillary barrier, soil airflow system and a subsurface wastewater injection/treatment system can be used to cool and treat wastewater. Wastewater typically undergoes both cooling and chemical treatment before release to the environment. Soil cooled by air injection offers both cooling and thermal buffering before the water returns to a gaining stream. Wastewater disposal in soil is typically limited by the ability of the soil to sorb a given contaminant. The loading capacity can be increased by periodic injection of chemicals into the subsurface irrigation/wastewater disposal system can be used to increase nutrient or contaminant loading capacity of a soil. An example chemical treatment system can use a mild reductant such as dithionate and reduced iron, such as ferrous sulfate, injected into the subsurface wastewater disposal system. Ferrous iron, when injected into oxygen-containing soils, quickly oxidizes to ferric oxides and hydroxides, which strongly adsorb oxyanions such as phosphate.

A subsurface irrigation system in connection with a gas flow system can be used for alternate injection of air and biogas or natural gas into the subsurface gas system to periodically cycle soil redox status. Many organic compounds, including caffeine, antibiotics and chlorinated solvents survive passage through wastewater treatment plants. The complex nature of many of these compounds and their rapid movement through wastewater treatment plants often make them resistant to degradation. Chlorinated solvents, for example, are so highly oxidized that the initial step in degradation is typically a reducing step such as in a soil environment containing methane from biogas or natural gas. Wastewater treatment plants also typically produce biogas from digesters. The next steps can then be taken in a soil environment containing air. Addition of materials, such as chemicals or organic matter, can be used to sorb and slow the downward vertical movement of these compounds in applied waste water which will increase the number of redox cycles these compounds experience and lead to more complete removal of these compounds.

There are a number of water quality trading pilots nationally driving a long-term increase in the value of low cost nutrient removal. Water quality trading allows point nutrient sources identified in a TMDL, such as a wastewater treatment plant, to use the marketplace to pay another party to reduce phosphate loading on behalf of the treatment plant. The practical economic implication of trading is that it is cheaper for municipal or industrial wastewater treatment plants to pay farmers to reduce phosphate loading by simple changes in fertility management and agronomic practices than it is to reduce phosphate levels using traditional civil engineering approaches. This has implications for both subsurface irrigation applications and for precision agriculture. In some embodiments, the subsurface irrigation disclosed herein (e.g., for improving thermal conductivity ($\lambda$) and volumetric water content ($C_v$) of the soil surrounding the GL tubing) may also beneficially provide low cost nutrient removal.

Wastewater Nutrient Recapture.

Agricultural soils have some capacity to absorb phosphate. There are an abundance of soils with both good infiltration rates and phosphate adsorption capacity. Phosphate-containing wastewater can be applied to agricultural fields with an expectation that plant uptake and soil sorption can reduce phosphate loading. If all wastewater were infiltrated and no phosphate was released (e.g., into neighboring bodies of water), then the phosphate allocation would be met and quantifiable tradable phosphate credits would be created.

Reductions in water flow and in phosphate levels will both contribute to meeting phosphate allocations. As an example, Meridian, Id., a city of approximately 60,000 has a water treatment plant with a capacity of about seven million gallons per day of wastewater or approximately 20 acre feet per day. This would require 120 acres of farmland to infiltrate an average of two inches of wastewater per day year around from the treatment plant.

Agronomics.

At the most relevant scale, agronomic practices and seasonal effects become important factors to evaluate as new water quality practices are integrated into a farming system with crop rotations, seasonal field practices and the potential for frozen soils in the face of ongoing infiltration requirements. Subsurface irrigation will be evaluated as a method to increase year round infiltration and to minimize interference with farm management. Crops, row topography and agronomic practices all affect infiltration rates.

Phosphate Sorption.

Although calcareous soils precipitate high levels of phosphate, it is unclear if the effects of factors such as preferential flow and kinetic limitations under conditions of sustained heavy loading may result in the overestimation of phosphate loading by batch test studies. As phosphate sorption becomes limiting, ferrous sulfate can be added to soil to create ferric hydroxide sorption sites for phosphate. Ferrous sulfate has been successfully used to sorb oxyanions in situ. Ferrous sulfate is also a common fertilizer used by farmers to provide iron to plants in calcareous soils. Ferrous sulfate can be dissolved in irrigation water and subsurface irrigated into the field. Subsequent oxidation of ferrous to ferric iron will provide sorption capacity testable at both batch and field scale. Ralph Ludwig (EPA-ORD) has used ferrous sulfate injection into subsurface aquifers to tie up chromate, another oxyanion.

Anaerobic Soil Disinfestation (ASD). ASD works by adding organic matter such as straw, organic liquids such as ethanol to soil followed by covering the soil with impermeable plastic to prevent air intrusion, which results in anaerobic soil conditions that kill many soil pathogens and result in subsequent improvements in crop quality and yields. By injecting gas phase reductants like methane or ethylene into a subsurface irrigation system, the soil may be more rapidly and more completely disinfested because of the high gas phase diffusion coefficients in soil (approximately four orders of magnitude higher than soil liquid phase diffusion). Rapid diffusion of a reducing gas allows rapid and uniform consumption of oxidants such as oxygen and nitrate that many soil disease organisms rely upon for survival.

Inert gases such as nitrogen or carbon dioxide can also be used, either as a mixture with reducing gases, or as a slow flux to reduce intrusion of oxygen from air and the associated loss of efficacy.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein. For example, site specific designs will depend upon the needs as well as a variety of soil properties and climate parameters. For green field construction, most sites will likely have several embodiments scaled to multiple infrastructure demands for multiple heating and cooling (both indoor and outdoor) and cleaning (removal of heat, particulates, solutes or gases) objectives.

What is claimed is:

1. A method comprising:
    cooling a premises with a ground source heat pump system that includes a subsurface ground loop portion surrounded by soil;
    forming a capillary barrier below the soil wherein a boundary between the capillary barrier and the soil is below the ground loop portion;
    applying, with a subsurface irrigation system disposed above the boundary between the capillary barrier and the soil, water to subsurface regions of the soil that are proximate to the subsurface ground loop portion thereby increasing heat transfer between the ground loop portion and the regions of soil that are proximate to the subsurface ground loop portion;
    perching water within the soil around the subsurface ground loop portion and above the boundary between the soil and the capillary barrier; and
    injecting a gas into the regions of soil that are proximate to the subsurface ground loop portion thereby cooling the regions of soil that are proximate to the subsurface ground loop portion wherein injecting gas includes injecting gas into the capillary barrier.

2. The method of claim 1, wherein applying water to the subsurface regions includes applying wastewater to the subsurface regions.

3. An environmental enhancement system comprising:
    a ground source heat pump to provide cooling to a premises, the ground source heat pump including a subsurface ground loop portion surrounded by soil;
    a water supply system including irrigation tubing to apply water to soil that is proximate to the subsurface ground loop portion thereby improving performance of the ground source heat pump by increasing heat transfer between the ground loop portion and the soil that is proximate to the subsurface ground loop portion;
    a capillary barrier positioned below the soil to impede downward water flow through the soil proximate to the ground loop portion, wherein a boundary between the capillary barrier and the soil is below the ground loop portion and below the irrigation tubing of the water supply system; and
    a gas injection system disposed to inject a gas into the soil that is proximate to the subsurface ground loop portion thereby enabling the water in the soil that is proximate to the subsurface ground loop to vaporize wherein the gas injection system includes gas injection tubing disposed within the capillary barrier.

4. The environmental enhancement system of claim 3, wherein the ground loop portion is buried no more than 1 meter below a surface of the soil.

5. The environmental enhancement system of claim 4, wherein the water supply system includes a wastewater supply system.

6. The environmental enhancement system of claim 3, wherein the capillary barrier includes sand.

* * * * *